(12) United States Patent
Kaushik (10) Patent No.: US 7,769,972 B2
(45) Date of Patent: Aug. 3, 2010

(54) STORAGE SYSTEM MANAGEMENT BASED ON A BACKUP AND RECOVERY SOLUTION EMBEDDED IN THE STORAGE SYSTEM

(75) Inventor: Shyam Kaushik, Bangalore (IN)

(73) Assignee: LSI Corporation, Milpitas, CA (US)

( * ) Notice: Subject to any disclaimer, the term of this patent is extended or adjusted under 35 U.S.C. 154(b) by 584 days.

(21) Appl. No.: 11/713,205

(22) Filed: Mar. 1, 2007

(65) Prior Publication Data

US 2008/0172536 A1    Jul. 17, 2008

(30) Foreign Application Priority Data

Jan. 18, 2007    (IN) .................... 120/07

(51) Int. Cl.
*G06F 12/00* (2006.01)
(52) U.S. Cl. ............... 711/162; 711/154
(58) Field of Classification Search ............. 711/161, 711/162, 165, 114, 112, 154; 714/4, 6
See application file for complete search history.

(56) References Cited

U.S. PATENT DOCUMENTS

| | | | |
|---|---|---|---|
| 5,404,508 A | 4/1995 | Konrad et al. | |
| 5,574,906 A | 11/1996 | Morris | |
| 5,673,382 A | 9/1997 | Cannon et al. | |
| 5,720,026 A | 2/1998 | Uemura et al. | |
| 5,974,563 A | 10/1999 | Beeler, Jr. | |
| 6,026,414 A | 2/2000 | Anglin | |
| 6,505,216 B1 * | 1/2003 | Schutzman et al. ......... | 711/162 |
| 6,526,418 B1 | 2/2003 | Midgley et al. | |
| 6,697,960 B1 | 2/2004 | Clark et al. | |
| 6,766,430 B2 | 7/2004 | Arakawa et al. | |
| 6,865,655 B1 * | 3/2005 | Andersen ............ | 711/162 |
| 6,892,221 B2 | 5/2005 | Ricart et al. | |
| 7,111,192 B2 | 9/2006 | Iguchi | |
| 7,143,250 B1 * | 11/2006 | Riedl .................. | 711/162 |
| 2007/0204120 A1 * | 8/2007 | Garimella et al. ......... | 711/162 |
| 2008/0140961 A1 * | 6/2008 | Atherton et al. .......... | 711/162 |

FOREIGN PATENT DOCUMENTS

WO    WO-2005084218 A2    9/2005

OTHER PUBLICATIONS

Cooper, B.F, Peer-to-peer data preservation through storage auctions, Parallel and Distributed Systems, IEEE Transactions on, Mar. 1, 2005, 246-257, 16-3.

(Continued)

*Primary Examiner*—Pierre-Michel Bataille
(74) *Attorney, Agent, or Firm*—Raj Abhyanker, P.C.

(57) ABSTRACT

A method and/or a system of storage system management based on a backup and recovery solution embedded in the storage system is disclosed. A method of a storage system includes coordinating with a host system through a backup coordinator module embedded in the host system during at least one of a backup operation and/or a recovery operation associated with the host system, performing the at least one of the backup operation and/or the recovery operation associated with the host system using a backup and recovery module embedded in a controller firmware of the storage system. The method may include the backup and recovery module which interfaces with the host system through the backup coordinator module is agnostic to an operating system of the host system.

37 Claims, 6 Drawing Sheets

OTHER PUBLICATIONS

High Performance Virtual Backup and Archive System, Computational Science—ICCS 2006, 2006, 671-678, 3993/2006, Springer Berlin / Heidelberg.

Springer Berlin; Adaptive Workload Balancing for Storage Management Applications in Multi Node Environments, Organic and Pervasive Computing; ARCS 2004, 322-337, 2981/2004.

Yan Han, An integrated high availability computing platform, The Electronic Library, 2005, 632-640, 23-6, Emerald Group Publishing Limited.

* cited by examiner

STORAGE SYSTEM MANAGEMENT BASED ON A BACKUP AND RECOVERY SOLUTION EMBEDDED IN THE STORAGE SYSTEM

FIELD OF TECHNOLOGY

This disclosure relates generally to the technical fields of hardware and/or software, and in one embodiment, to a system and method of storage system management based on a backup and recovery solution embedded in the storage system.

BACKGROUND

A backup and recovery solution application may be operated out of a host system (e.g., through a backup and recovery application residing within the host system). The backup and/or recovery application may use a volume snapshot capacity of a storage system coupled to the backup and/or recovery application to perform a backup and/or recovery operation.

The backup and/or recovery application may place the host system in a hot backup mode (e.g., for a short period of time) until a snapshot of a volume (e.g., logical and/or physical) of a storage area associated with the host system is taken. Once the snapshot is taken, an image of the snapshot may be backed up (e.g., replicated) to a backup media.

However, a management of the backup and/or recovery operation may be performed away from the storage system by several host systems (e.g., at least one host system). As a result, the backup and/or recovery application may have to be installed in several host systems, thus incurring a sizable expense for licensing and/or purchasing the backup and/or recovery solution. Furthermore, the backup and/or recovery application may need to be compatible with an operating system (OS) of each operating system (OS) of the several host systems.

Furthermore, high availability characteristics of the host system (e.g., an ability of a user community to access the host system) may render the host system to be more failure prone, thus interrupting the backup and/or recovery operation during a failed state of the host system.

SUMMARY OF THE DISCLOSURE

A system and method of storage system management based on a backup and recovery solution embedded in the storage system are disclosed. In one aspect, a method of a storage system includes coordinating with a host system through a backup coordinator module embedded in the host system during a backup operation and/or a recovery operation associated with the host system, and performing the backup operation and/or the recovery operation associated with the host system using a backup and recovery module (e.g., the backup and recovery module that may interface with the host system through the backup coordinator module may be agnostic to an operating system of the host system) embedded in a controller firmware of the storage system.

In addition, the method may include generating a backup signal data to the backup coordinator module when a backup command data of a console coupled to the storage system is processed in the backup and recovery module to initiate the backup operation. The method may further include placing the host system in a hot backup mode when the backup signal data is processed in the backup coordinator module, and/or communicating a backup acknowledgment data of the backup coordinator module to the backup and recovery module.

Furthermore, the method may include replicating to a backup media (e.g., a disk, a virtual disk, a tape, and/or a virtual tape which is external and/or internal to the storage system) an internal snapshot of a storage area associated with the host system when the backup acknowledgement data of the backup coordinator module is processed in the backup and recovery module. The method may also include deactivating the hot backup mode of the host system based on a backup termination data of the backup and recovery module communicated to the backup coordinator module when the backup operation is completed.

Moreover, the method may include replicating a difference in data between another internal snapshot taken at a later time and the internal snapshot to the backup media (e.g., the difference in the data may be obtained through comparing a mapping of another internal snapshot and a mapping of the internal snapshot) during the backup operation. The method may further include generating a recovery signal data to a recovery coordinator module of the host system when a recovery command data of the console coupled to the storage system is processed in the backup and recovery module to initiate the recovery operation.

In addition, the method may include executing the backup operation and/or the recovery operation of a legacy host system coupled to the storage system with the backup and recovery module through bypassing the backup and recovery module of the storage system to perform the backup operation and/or the recovery operation that may be managed by a legacy backup and recovery module embedded in the legacy host system.

The method may also include creating a hierarchical storage management (HSM) system and/or an information lifecycle management (ILM) system based on the host system having the backup coordinator module and/or the storage system having the backup and recovery module. Furthermore, the method may include connecting any number of the storage system(s) each having the backup and recovery module to introduce a clustering capability to any number of the storage system(s) such that any number of the storage system(s) may work like a single storage system.

In another aspect, a system includes a backup and recovery module (e.g., the backup and the recovery module may reside in a controller firmware) of a storage system to perform a backup operation and a recovery operation associated with a host system, and a backup coordinator module of the host system to manage the host system during the backup operation and/or the recovery operation. The system may include a console coupled to the storage system to trigger the backup operation and/or the recovery operation of a storage area associated with the host system. In addition, the system may include an algorithm embedded in the backup and recovery module to automatically trigger the backup operation (e.g., the backup operation may be preprogrammed based on a temporal schedule) and/or the recovery operation (e.g., the recovery operation may be initiated at a failed instance of the host system).

In yet another aspect, an article of manufacture in a controller firmware of a storage system includes a machine readable program. Furthermore, the machine readable program includes the functions of generating a backup signal data to initiate a backup operation of a storage area associated with a host application, placing the host application in a hot backup mode through communicating the backup signal data to a backup coordinator module of a host system having the host application, and replicating an internal snapshot of the storage area to a backup media.

The machine readable program may further include the functions of processing a backup command data of a console to initiate the backup operation. In addition, the machine readable program may include the functions generating a recovery signal data to initiate a recovery operation of the host system.

The methods, systems, and apparatuses disclosed herein may be implemented in any means for achieving various aspects, and may be executed in a form of a machine-readable medium embodying a set of instructions that, when executed by a machine, cause the machine to perform any of the operations disclosed herein.

BRIEF DESCRIPTION OF THE DRAWINGS

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

A method and/or a system of storage system management based on a backup and recovery solution embedded in the storage system is disclosed. In the following description, for the purposes of explanation, numerous specific details are set forth in order to provide a thorough understanding of the various embodiments. It will be evident, however to one skilled in the art that the various embodiments may be practiced without these specific details.

In one embodiment, a method of a storage system (e.g., a storage system 102 of FIG. 1) includes coordinating with a host system (e.g., a host system 108) through a backup coordinator module (e.g., a backup coordinator module 110) embedded in the host system during a backup operation and a recovery operation associated with the host system and performing the backup operation and the recovery operation associated with the host system using a backup and recovery module (e.g., a backup and recovery module 104) embedded in a controller firmware (e.g., a controller firmware 204 of FIG. 2) of the storage system.

In another embodiment, a system includes a backup and recovery module of a storage system to perform a backup operation and a recovery operation associated with a host system and a backup coordinator module of the host system to manage the host system during the backup operation and the recovery operation.

In yet another embodiment, an article of manufacture in a controller firmware of a storage system having a machine readable program, in which the machine readable program includes functions of generating a backup signal data to initiate a backup operation of a storage area associated with a host application, placing the host application in a hot backup mode through communicating the backup signal data to a backup coordinator module of a host system having the host application and replicating an internal snapshot of the storage area to a backup media.

Figure 1:
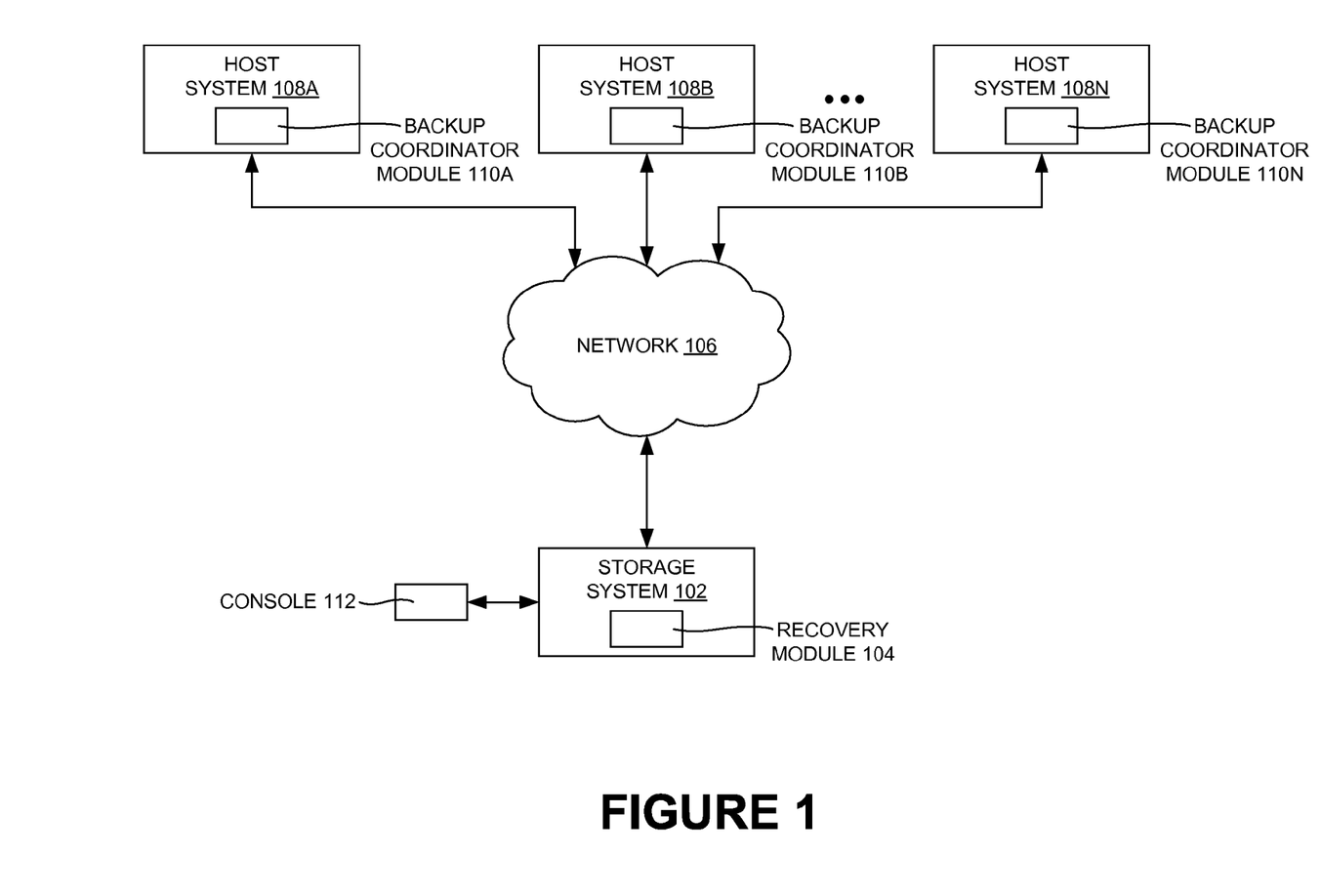
FIG. 1 is a system view of a storage system communicating with host systems through a network, according to one embodiment.

FIG. 1 is a system view of a storage system 102 communicating with host systems 108 through a network 106, according to one embodiment. Particularly, FIG. 1 illustrates the storage system 102, a backup and recovery module 104, the network 106, the host system 108A-N, a backup coordinator module 110A-N and/or a console 112, according to one embodiment. The storage system 102 may take a snapshot of a data that needs backup. The storage system 102 may copy and/or backup the software and/or report the status of copy completion, backup software reports status.

The storage system 102 may include the backup and recovery module 104. The storage system 102 may take the ownership of backup media (e.g., a disk, a virtual disk, a tape and/or a virtual tape) and/or manage across the backup operation along with the disk drives. The backup and recovery module 104 may keep a backup of the backup media (e.g., the disk, the virtual disk, the tape and/or the virtual tape) that may reside internal and/or external to the storage system 102 and/or may recover the lost data through a recovery signal performing a backup and recovery operation.

The network 106 may the help storage system to interact with the host system 108A-N in transferring the data from the backup and recovery module 104. The network 106 may also help in transferring data from the backup coordinator module 110A-N of the host system 108A-N to backup and recovery module of the storage system 102. The host system 108A-N may be a system that may provide services (e.g., a printer, web and/or database access) to the storage system 102 through the network 106. The host system 108A-N may be placed in a hot backup mode when the backup signal data is processed in the backup coordinator module 110A-N. A hot backup may be a backup performed on data even though it may be actively accessible and/or may currently be in a state of being updated.

The backup coordinator module 110A-N may interact with the backup and recovery module 104 through the host system 108A-N, the network 106 and/or the storage system 102 to coordinate and/or backup and recover the data from the backup media (e.g., the disk, the virtual disk, the tape and/or the virtual tape). The backup coordinator module 110A-N may communicate a backup acknowledgement data to the backup and recovery module 104. The console 112 may be a text entry and/or display device for system administration messages and/or may couple with storage system to initiate any one of the backup operation and/or the recovery operation.

In example embodiment of FIG. 1, the network 106 may communicate with the storage system 102, and any number of the host systems 108A-N. The storage system 102 may also communicate with the console 112. Furthermore, the storage system 102 may include the backup and recovery module 104 to perform the backup operation and/or recovery operation. In addition, the host system 108A-N may include a backup coordinator module 110A-N that may coordinate with the storage system 102.

For example, the host system 108A-N may be coordinated through the backup coordinator module 110A-N embedded in the host system 108A-N during the backup operation and/or the recovery operation associated with the host system 108A-N. Furthermore, the backup operation and/or the recovery operation may be associated with the host system 108A-N and may be performed using a backup and recovery module 104 embedded in a controller firmware of the storage system 102. A backup signal data may be generated to the backup coordinator module 110A-N when a backup command data of the console coupled to the storage system 102 is processed in the backup and recovery module 104 to initiate the backup operation.

In addition, the host system 108A-N may be placed in the hot backup mode when the backup signal data is processed in the backup coordinator module 110A-N. The backup acknowledgment data of the backup coordinator module 110A-N may be communicated to the backup and recovery module 104. Moreover, an internal snapshot of a storage area (e.g., the storage area 206 of FIG. 2) associated with the host system 108A-N may be replicated on a backup media when the backup acknowledgement data of the backup coordinator module 110A-N may be processed in the backup and recovery module 104.

Also, the hot backup mode of the host system 108A-N may be deactivated based on a backup termination data of the backup and recovery module 104 communicated to the backup coordinator module 110A-N when the backup operation is completed. A recovery signal data may be generated to a recovery coordinator module (e.g., of the backup and recovery module 104) of the host system when a recovery command data of the console coupled to the storage system 102 is processed in the backup and recovery module 104 to initiate the recovery operation.

Furthermore, the backup operation and/or the recovery operation of a legacy host system coupled to the storage system 102 with the backup and recovery module 104 may be executed through bypassing the backup and recovery module 104 of the storage system 102 to perform the backup operation and/or the recovery operation which may be managed by a legacy backup and recovery module embedded in the legacy host system. In addition, a hierarchical storage management (HSM) system and an information lifecycle management (ILM) system may be created based on the host system having the backup coordinator module 110A-N and the storage system 102 having the backup and recovery module 104.

A multiple number of the storage system 102 each having the backup and recovery module 104 may be connected to introduce a clustering capability to the multiple number of the storage system 102 such that the multiple number of the storage system 102 may work like a single storage system.

Furthermore, a system may include the backup and recovery module 104 of the storage system 102 to perform the backup operation and/or the recovery operation (e.g., the backup operation may be preprogrammed based on a temporal schedule and the recovery operation that may be initiated at a failed instance of the host system 108A-N) may be associated with the host system 108A-N. The system also may include the backup coordinator module 110A-N of the host system 108A-N to manage the host system 108A-N during the backup operation and the recovery operation.

The system may further include the console coupled to the storage system 102 to trigger the backup operation and the recovery operation of a storage area (e.g., the storage area 206 of FIG. 2) associated with the host system 108A-N. Moreover, the system may include an algorithm embedded in the backup and recovery module 104 (e.g., the backup and recovery module may reside in the controller firmware of the storage system) to automatically trigger the backup operation and/or the recovery operation.

Figure 2:
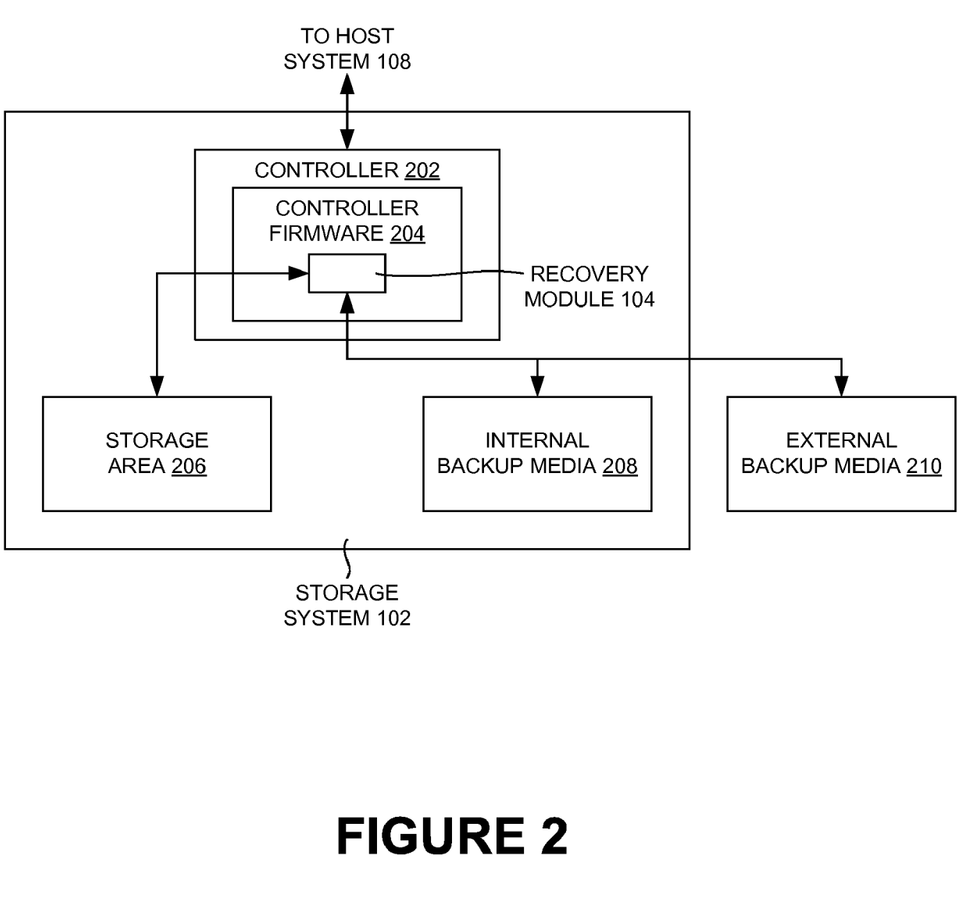
FIG. 2 is an exploded view of the storage system of FIG. 1, according to one embodiment.

FIG. 2 is an exploded view of the storage system of FIG. 1, according to one embodiment. Particularly, FIG. 2 illustrates the storage system 102, the backup and recovery module 104, the host system 108, a controller 202, a controller firmware 204, storage area 206, an internal backup media 208 and/or an external backup media 210, according to one embodiment. The storage system 102 illustrates the backup and recovery module 104, according to one embodiment. The storage system 102 may take the ownership of the backup media (e.g., the disk, the virtual disk, the tape and/or the virtual tape) and/or manage across the backup operation along with the disk drives.

The backup and recovery module 104 may keep a backup of the backup media (e.g., the disk, the virtual disk, the tape and/or the virtual tape) that may reside internal and/or external to the storage system 102 and/or may recover a lost data through the recovery signal performing the backup and recovery operation. The controller 202 may include a data channel interface having an independent, bidirectional channel interface for transmitting and receiving commands, data, and status with one or more host system 108A-N.

The controller firmware 204 may be a software embedded in a hardware device that may provide the necessary instructions for communication with the other computer peripherals and/or may store on flash ROMs. The storage area 206 may be an area designed to attach computer storage devices such as disk array controllers and/or tape libraries to servers. The backup media may be the internal backup media 208 and/or the external backup media 210. In the internal backup media 208 and/or external backup media 210, the storage system may take the complete ownership of the backup media and/or manage it across the backup operation.

In example embodiment of FIG. 2, the storage system may include the controller 202, the storage area 206, the internal backup media 208, and/or the external backup media 210. The host system 108A-N may communicate with the controller 202. The controller 202 may also include the controller firmware 204. The controller firmware 204 may further include the backup and recovery module (e.g., the backup and recovery module 104 of FIG. 1) that may communicate with the storage area 206, the internal backup media 208 and/or the external backup media 210.

For example, the backup operation and/or the recovery operation associated with the host system (e.g., the host system 108A-N of FIG. 1) may be performed using the backup and recovery module (e.g., the backup and recovery module 104 of FIG. 1 that may interface with the host system (e.g., the host system 108A-N of FIG. 1) through the backup coordinator module 110A-N that may be agnostic to an operating system of the host system) embedded in the controller firmware of the storage system (e.g., the storage system 102 of FIG. 1).

In addition, the backup acknowledgment data of the backup coordinator module (e.g., the backup coordinator module of FIG. 1) may be communicated to the backup and recovery module (e.g., the backup and recovery module 104 of FIG. 1). Furthermore, the internal snapshot of the storage area 206 associated with the host system (e.g., the storage system 102 of FIG. 1) may be replicated on the backup media (e.g., the backup media may be the disk, the virtual disk, the tape, and/or the virtual tape that may be external or internal to the storage system) when the backup acknowledgement data of the backup coordinator module (e.g., the backup coordinator module 110A-N) is processed in the backup and recovery module (e.g., the backup and recovery module 104 of FIG. 1).

Also, a difference in data (e.g., the difference in data may be obtained through comparing a mapping of another internal snapshot and a mapping of the internal snapshot) may be replicated between another internal snapshot taken at a later time and the internal snapshot to the backup media during the backup operation.

Furthermore, the system includes the backup and recovery module (e.g., the backup and recovery module 104 of FIG. 1) of the storage system (e.g., the storage system 102 of FIG. 1) to perform the backup operation and/or the recovery operation (e.g., the backup operation may be preprogrammed based on a temporal schedule and the recovery operation is initiated at the failed instance of the host system) associated with the host system (e.g., the host system 108A-N). Moreover, the system may include the algorithm embedded in the backup and recovery module (e.g., the backup and recovery module may reside in the controller firmware of the storage system) to automatically trigger the backup operation and/or the recovery operation.

Figure 3:
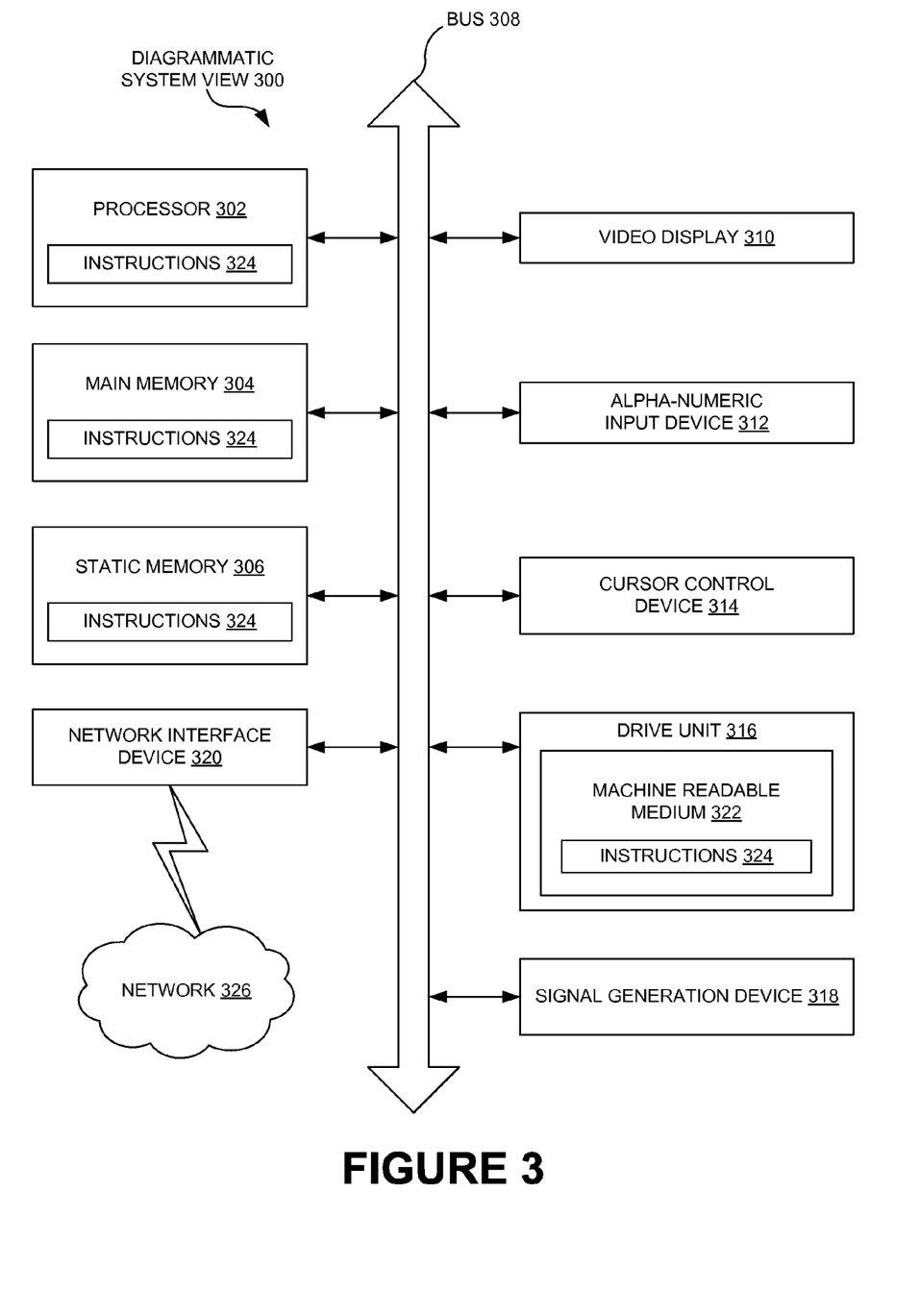
FIG. 3 is a diagrammatic system view of a data processing system in which any of the embodiments disclosed herein may be performed, according to one embodiment.

FIG. 3 is a diagrammatic system view 300 of a data processing system in which any of the embodiments disclosed herein may be performed, according to one embodiment. Particularly, the system view 300 of FIG. 3 illustrates a processor 302, a main memory 304, a static memory 306, a bus 308, a video display 310, an alpha-numeric input device 312, a cursor control device 314, a drive unit 316, a signal generation device 318, a network interface device 320, a machine readable medium 322, instructions 324, and a network 326, according to one embodiment.

The diagrammatic system view 300 may indicate a personal computer and/or a data processing system in which one or more operations disclosed herein are performed. The processor 302 may be microprocessor, a state machine, an application specific integrated circuit, a field programmable gate array, etc. (e.g., Intel® Pentium® processor). The main memory 304 may be a dynamic random access memory and/or a primary memory of a computer system. The static memory 306 may be a hard drive, a flash drive, and/or other memory information associated with the data processing system.

The bus 308 may be an interconnection between various circuits and/or structures of the data processing system. The video display 310 may provide graphical representation of information on the data processing system. The alpha-numeric input device 312 may be a keypad, keyboard and/or any other input device of text (e.g., a special device to aid the physically handicapped). The cursor control device 314 may be a pointing device such as a mouse.

The drive unit 316 may be a hard drive, a storage system, and/or other longer term storage subsystem. The signal generation device 318 may be a bios and/or a functional operating system of the data processing system. The network interface device 320 may be a device that may perform interface functions such as code conversion, protocol conversion and/or buffering required for communication to and from a network. The machine readable medium 322 may provide instructions on which any of the methods disclosed herein may be performed. The instructions 324 may provide source code and/or data code to the processor 302 to enable any one or/or more operations disclosed herein.

For example, an article of manufacture in a controller firmware of a storage system (e.g., the storage system 102 of FIG. 1) includes a machine readable program. The machine readable program may include functions of generating the backup signal data to initiate the backup operation of the storage area (e.g., the storage area 206 of FIG. 2) associated with a host application. The machine readable program may include functions of placing the host application in a hot backup mode through communicating the backup signal data to the backup coordinator module (e.g., the backup coordinator module 110A-N) of the host system (e.g., the host system 108A-N) having the host application.

In addition, the machine readable program may include functions of replicating the internal snapshot of the storage area (e.g., the storage area 206 of FIG. 2) to the backup media. The machine readable program may also include functions of processing a backup command data of a console to initiate the backup operation. Moreover, the machine readable program may include functions of generating a recovery signal data to initiate a recovery operation of the host system (e.g., the host system 108A-N).

Figure 4:
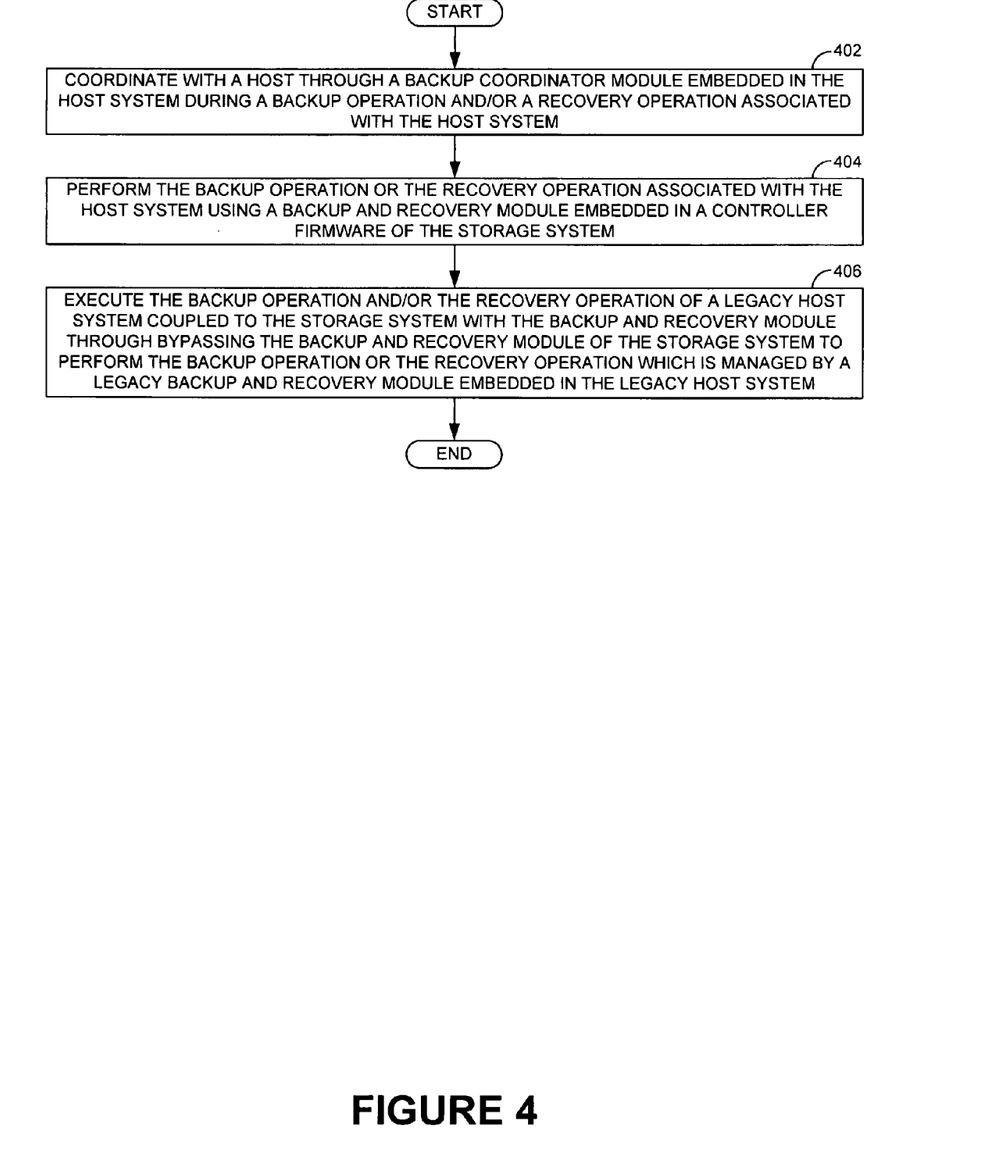
FIG. 4 is a process flow of executing a backup and recovery operation of legacy host system, according to one embodiment.

FIG. 4 is a process flow of executing a backup and a recovery operation of legacy host system, according to one embodiment. In operation 402, a host (e.g., the host system 108A-N of FIG. 1) may be coordinated through a backup coordinator module (e.g., the backup coordinator module 110A-N of FIG. 1) embedded in the host system (e.g., the host system 108A-N of FIG. 1) during a backup operation and/or a recovery operation associated with the host system (e.g., the host system 108A-N of FIG. 1). In operation 404, the backup operation and/or the recovery operation associated with the host system (e.g., the host system 108A-N of FIG. 1) may be performed using a backup and recovery module (e.g., the backup and recovery module 104 of FIG. 1) embedded in a controller firmware of a storage system (e.g., the storage system 102 of FIG. 1).

In operation 406, the backup operation and/or the recovery operation of a legacy host system coupled to the storage system (e.g., the storage system 102 of FIG. 1) with the backup and recovery module (e.g., the backup and recovery module 104 of FIG. 1) may be executed through bypassing the backup and recovery module (e.g., the backup and recovery module 104 of FIG. 1) of the storage system (e.g., the storage system of 102 of FIG. 1) to perform the backup operation or the recovery operation that may be managed by a legacy backup and recovery module embedded in the legacy host system.

Figure 5:
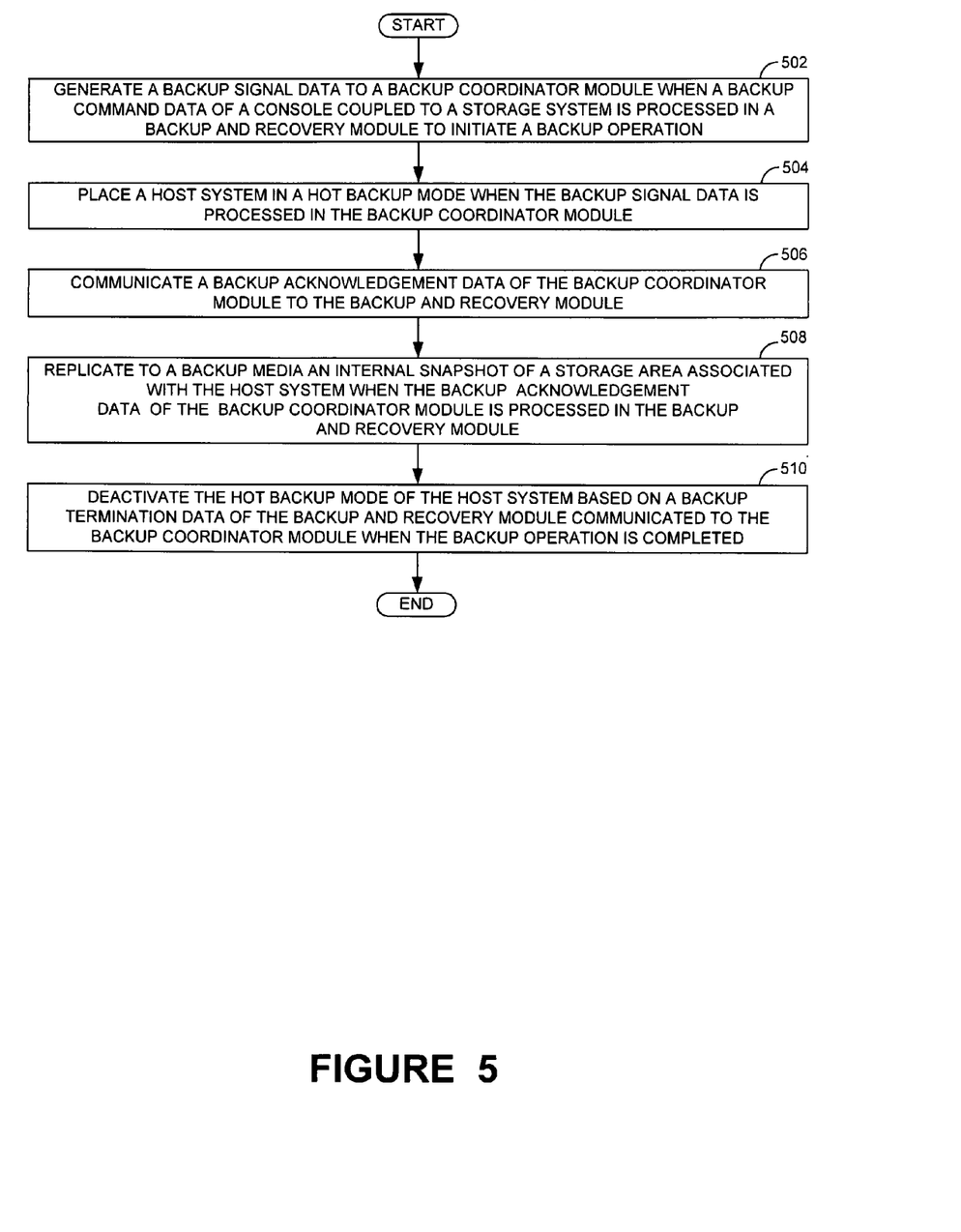
FIG. 5 is a process flow of replicating to a backup media an internal snapshot of the storage area, according to one embodiment.

FIG. 5 is a process flow of replicating to a backup media an internal snapshot of a storage area, according to one embodiment. In operation 502, a backup signal data to a backup coordinator module (e.g., the backup coordinator module 110A-N of FIG. 1) may be generated when a backup command data of a console (e.g., the console 112 of FIG. 1) coupled to a storage system (e.g., the storage system 102 of FIG. 1) is processed in a backup and recovery module to initiate a backup operation. In operation 504, a host system (e.g., the host system 108A-N) may be placed in a hot backup mode when the backup signal data is processed in the backup coordinator module (e.g., the backup coordinator module 110A-N).

In operation 506, a backup acknowledgement data of the backup coordinator module (e.g., the backup coordinator module 110A-N) may be communicated to the backup and recovery module (e.g., the backup and recovery module 104 of FIG. 1). In operation 508, an internal snapshot of the storage area (e.g., the storage area 206 of FIG. 2) may be replicated to a backup media associated with the host system (e.g., the host system 108A-N of FIG. 1) when the backup acknowledgement data of the backup coordinator module (e.g., the backup coordinator module 110A-N) is processed in the backup and recovery module (e.g., the backup and recovery module 104 of FIG. 1). In operation 510, the hot backup mode of the host system (e.g., the host system 108A-N of FIG. 1) may be deactivated based on a backup termination data of the backup and recovery module communicated to the backup coordinator module (e.g., the host system 108A-N of FIG. 1) when the backup operation is completed.

Figure 6:
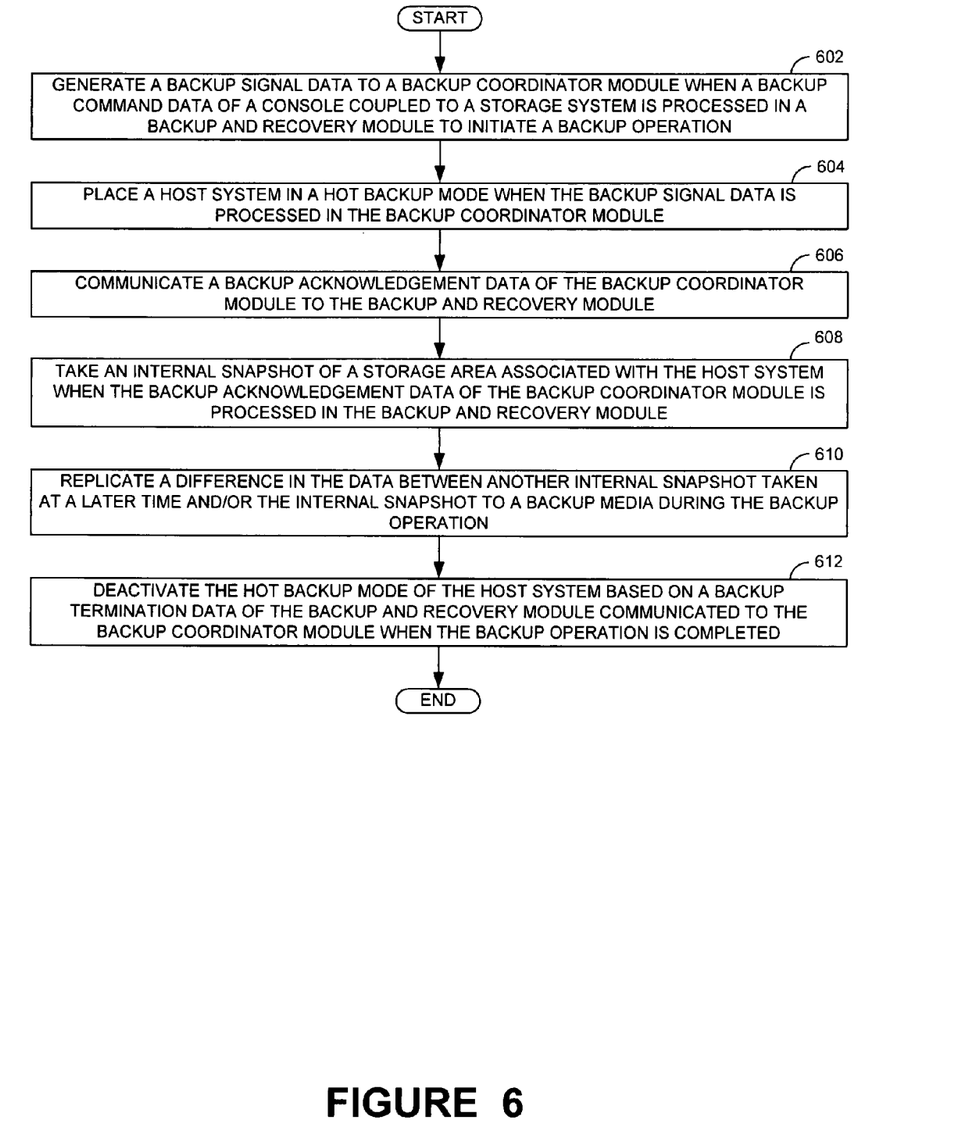
FIG. 6 is a process flow of replicating a difference in data between another internal snapshot, according to one embodiment.

FIG. 6 is a process flow of replicating a difference in data between another internal snapshot, according to one embodiment. In operation 602, a backup signal data may be generated to a backup coordinator module (e.g., the backup coordinator module 110A-N of FIG. 1) when a backup command data of a console (e.g., the console of 112 of FIG. 1) coupled to a storage system (e.g., the storage system 102 of FIG. 1) is processed in a backup and recovery module (e.g., the backup and recovery module 104 of FIG. 1) to initiate a backup operation. In operation 604, a host system (e.g., the host system 108A-N of FIG. 1) may be placed in a hot backup mode when the backup signal data is processed in the backup coordinator module (e.g., the backup coordinator module 110A-N of FIG. 1).

In operation 606, a backup acknowledgement data of the backup coordinator module (e.g., the backup coordinator module 110A-N of FIG. 1) may be communicated to the backup and recovery module (e.g., the backup and recovery module 104 of FIG. 1). In operation 608, an internal snapshot of a storage area (e.g., the storage area 206 of FIG. 2) associated with the host system (e.g., the host system 108A-N of FIG. 1) may be taken when the backup acknowledgement data of the backup coordinator module (e.g., the backup coordinator module 110A-N of FIG. 1) is processed in the backup and recovery module (e.g., the backup and recovery module 104 of FIG. 1).

In operation 610, a difference in the data between another internal snapshot taken at a later time and the internal snapshot to a backup media during the backup operation may be replicated. In operation 612, the hot backup mode of the host system (e.g., the host system 108A-N of FIG. 1) may be deactivated based on a backup termination data of the backup and recovery module (e.g., the backup and recovery module 104 of FIG. 1) communicated to the backup coordinator module (e.g., the backup coordinator module 110A-N of FIG. 1) when the backup operation is completed.

In addition, it will be appreciated that the various operations, processes, and methods disclosed herein may be embodied in a machine-readable medium and/or a machine accessible medium compatible with a data processing system (e.g., a computer system), and may be performed in any order. Accordingly, the specification and drawings are to be regarded in an illustrative rather than a restrictive sense.

What is claimed is:

1. A method of a storage system, comprising:
coordinating with a host system through a backup coordinator module embedded in the host system during at least one of a backup operation and a recovery operation associated with the host system;
performing the at least one of the backup operation and the recovery operation associated with the host system using a backup and recovery module embedded in a controller firmware of the storage system;
generating a backup signal data to the backup coordinator module when a backup command data of a console coupled to the storage system is processed in the backup and recovery module to initiate the backup operation;
placing the host system in a hot backup mode when the backup signal data is processed in the backup coordinator module; and
communicating a backup acknowledgment data of the backup coordinator module to the backup and recovery module.

2. The method of claim 1 wherein the backup and recovery module which interfaces with the host system through the backup coordinator module is agnostic to an operating system of the host system.

3. The method of claim 2 further comprising generating a recovery signal data to a recovery coordinator module of the host system when a recovery command data of a console coupled to the storage system is processed in the backup and recovery module to initiate the recovery operation.

4. The method of claim 1 further comprising replicating to a backup media an internal snapshot of a storage area associated with the host system when the backup acknowledgement data of the backup coordinator module is processed in the backup and recovery module.

5. The method of claim 4 further comprising deactivating the hot backup mode of the host system based on a backup termination data of the backup and recovery module communicated to the backup coordinator module when the backup operation is completed.

6. The method of claim 5 further comprising replicating a difference in data between another internal snapshot taken at a later time and the internal snapshot to the backup media during the backup operation, wherein the difference in a data is obtained through comparing a mapping of the another internal snapshot and a mapping of the internal snapshot.

7. The method of claim 6 wherein the backup media is at least one of a disk, a virtual disk, a tape, and a virtual tape which is external or internal to the storage system.

8. The method of claim 1 further comprising executing the at least one of the backup operation and the recovery operation of a legacy host system coupled to the storage system with the backup and recovery module through bypassing the backup and recovery module of the storage system to perform the at least one of the backup operation and the recovery operation which is managed by a legacy backup and recovery module embedded in the legacy host system.

9. The method of claim 8 further comprising creating at least one of a hierarchical storage management (HSM) system and an information lifecycle management (ILM) system based on the host system having the backup coordinator module and the storage system having the backup and recovery module.

10. The method of claim 1 further comprising connecting a multiple number of the storage system each having the backup and recovery module to introduce a clustering capability to the multiple number of the storage system such that the multiple number of the storage system works like a single storage system.

11. The method of claim 1 in a form of a machine-readable medium embodying a set of instructions that, when executed by a machine, causes the machine to perform the method of claim 1.

12. A method of a storage system, comprising:
coordinating with a host system through a backup coordinator module embedded in the host system during at least one of a backup operation and a recovery operation associated with the host system;
performing the at least one of the backup operation and the recovery operation associated with the host system using a backup and recovery module embedded in a controller firmware of a storage system;
executing the at least one of the backup operation and the recovery operation of a legacy host system coupled to the storage system with the backup and recovery module through bypassing the backup and recovery module of the storage system to perform the at least one of the backup operation and the recovery operation which is managed by a legacy backup and recovery module embedded in the legacy host system; and creating at least one of a hierarchical storage management (HSM) system and an information lifecycle management (ILM) system based on the host system having the backup coordinator module and the storage system having the backup and recovery module.

13. The method of claim 12 wherein the backup and recovery module which interfaces with the host system through the backup coordinator module is agnostic to an operating system of the host system.

14. The method of claim 13 further comprising generating a backup signal data to the backup coordinator module when a backup command data of a console coupled to the storage system is processed in the backup and recovery module to initiate the backup operation.

15. The method of claim 14, further comprising:
placing the host system in a hot backup mode when the backup signal data is processed in the backup coordinator module; and
communicating a backup acknowledgment data of the backup coordinator module to the backup and recovery module.

16. The method of claim 15 further comprising replicating to a backup media an internal snapshot of a storage area associated with the host system when the backup acknowledgement data of the backup coordinator module is processed in the backup and recovery module.

17. The method of claim 16 further comprising deactivating the hot backup mode of the host system based on a backup termination data of the backup and recovery module communicated to the backup coordinator module when the backup operation is completed.

18. The method of claim 17 further comprising replicating a difference in data between another internal snapshot taken at a later time and the internal snapshot to the backup media during the backup operation, wherein the difference in a data is obtained through comparing a mapping of the another internal snapshot and a mapping of the internal snapshot.

19. The method of claim 18 wherein the backup media is at least one of a disk, a virtual disk, a tape, and a virtual tape which is external or internal to the storage system.

20. The method of claim 13 further comprising generating a recovery signal data to a recovery coordinator module of the host system when a recovery command data of a console coupled to the storage system is processed in the backup and recovery module to initiate the recovery operation.

21. The method of claim 12 further comprising executing the at least one of the backup operation and the recovery operation of the legacy host system coupled to the storage system with the backup and recovery module through bypassing the backup and recovery module of the storage system to perform the at least one of the backup operation and the recovery operation which is managed by the legacy backup and recovery module embedded in the legacy host system.

22. The method of claim 21 further comprising creating at least one of the hierarchical storage management (HSM) system and the information lifecycle management (ILM) system based on the host system having the backup coordinator module and the storage system having the backup and recovery module.

23. The method of claim 12 further comprising connecting a multiple number of the storage system each having the backup and recovery module to introduce a clustering capability to the multiple number of the storage system such that the multiple number of the storage system works like a single storage system.

24. A system, comprising:
a backup and recovery module of a storage system to perform at least one of a backup operation and a recovery operation associated with a host system;
a backup coordinator module of the host system to manage the host system during the at least one of the backup operation and the recovery operation;
the backup coordinator module to process a backup signal data when a backup command data of a console coupled to the storage system is processed in the backup and recovery module to initiate the backup operation;
the backup coordinator module to process the backup signal data by placing the host system in a hot backup mode; and
the backup coordinator module to communicate a backup acknowledgement data to the backup and recovery module.

25. The system of claim 24 further comprising a console coupled to the storage system to trigger the at least one of the backup operation and the recovery operation of a storage area associated with the host system.

26. The system of claim 25 further comprising an algorithm embedded in the backup and recovery module to automatically trigger the at least one of the backup operation and the recovery operation, wherein the backup operation is pre-programmed based on a temporal schedule and the recovery operation is initiated at a failed instance of the host system.

27. The system of claim 24 wherein the backup and recovery module to reside in a controller firmware of the storage system.

28. A system, comprising:
a backup and recovery module of a storage system to perform at least one of a backup operation and a recovery operation associated with a host system;
a backup coordinator module of the host system to manage the host system during the at least one of the backup operation and the recovery operation;
a legacy host system coupled to the storage system with the backup and recovery module to execute at least one of the backup operation and the recovery operation through bypassing the backup and recovery module of the storage system to perform at least one of the backup operation and the recovery operation which is managed by a legacy backup and recovery module embedded in the legacy host system; and
a hierarchical storage management system and an information life cycle management (ILM) system created based on the host system having the backup coordinator module and the storage system having the backup and recovery module.

29. The system of claim 28 further comprising a console coupled to the storage system to trigger the at least one of the backup operation and the recovery operation of a storage area associated with the host system.

30. The system of claim 29 further comprising an algorithm embedded in the backup and recovery module to automatically trigger the at least one of the backup operation and the recovery operation, wherein the backup operation is pre-programmed based on a temporal schedule and the recovery operation is initiated at a failed instance of the host system.

31. The system of claim 28 wherein the backup and recovery module to reside in a controller firmware of the storage system.

32. An article of manufacture in a controller firmware of a storage system having a machine readable program, wherein the machine readable program is comprised of functions of:
generating a backup signal data to initiate a backup operation of a storage area associated with a host application;
placing the host application in a hot backup mode through communicating the backup signal data to a backup coordinator module of a host system having the host application;
communicating a backup acknowledgement data of the backup coordinator module to a backup and recovery module;
replicating an internal snapshot of the storage area to a backup media;
deactivating the hot backup mode of the host system based on a backup termination data of the backup and recovery module communicated to the backup coordinator module when the backup operation is completed; and
replicating a difference in data between another internal snapshot taken at a later time and the internal snapshot to the backup media during the backup operation, wherein the difference in a data is obtained trough comparing a mapping of the another internal snapshot and a mapping of the internal snapshot, wherein the backup media is at least one of a disk, a virtual disk, a tape, and a virtual tape which is external or internal to the storage system.

33. The article of manufacture of claim 32 further comprising processing a backup command data of a console to initiate the backup operation.

34. The article of manufacture of claim 33 further comprising generating a recovery signal data to initiate a recovery operation of the host system.

35. An article of manufacture in a controller firmware of a storage system having a machine readable program, wherein the machine readable program is comprised of functions of:
generating a backup signal data to initiate a backup operation of a storage area associated with a host application;
placing the host application in a hot backup mode through communicating the backup signal data to a backup coordinator module of a host system having the host application;
replicating an internal snapshot of a storage area to a backup media;
executing the at least one of the backup operation and a recovery operation of a legacy host system coupled to the storage system with the backup and recovery module through bypassing the backup and recovery module of the storage system to perform the at least one of the backup operation and the recovery operation which is managed by a legacy backup and recovery module embedded in the legacy host system; and
creating at least one of a hierarchical storage management (HSM) system and an information lifecycle management (ILM) system based on the host system having the backup coordinator module and the storage system having the backup and recovery module.

36. The article of manufacture of claim 35 further comprising processing a backup command data of a console to initiate the backup operation.

37. The article of manufacture of claim 36 further comprising generating a recovery signal data to initiate a recovery operation of the host system.

* * * * *